United States Patent
Hoag et al.

(10) Patent No.: US 9,053,189 B2
(45) Date of Patent: Jun. 9, 2015

(54) CUSTOMIZING CONTENT DISPLAYED FOR A USER BASED ON USER PREFERENCES OF ANOTHER USER

(75) Inventors: Andrew J. Hoag, San Francisco, CA (US); Elisha J. Fitch-Cook, Sunfield, MI (US)

(73) Assignee: IFWE INC., San Francisco, CA (US)

( * ) Notice: Subject to any disclaimer, the term of this patent is extended or adjusted under 35 U.S.C. 154(b) by 524 days.

(21) Appl. No.: 12/728,176

(22) Filed: Mar. 19, 2010

(65) Prior Publication Data

US 2011/0231778 A1    Sep. 22, 2011

(51) Int. Cl.
*G06F 3/01* (2006.01)
*G06F 17/30* (2006.01)

(52) U.S. Cl.
CPC .... *G06F 17/30867* (2013.01); *G06F 17/30893* (2013.01)

(58) Field of Classification Search
USPC .......................................................... 715/745
See application file for complete search history.

(56) References Cited

U.S. PATENT DOCUMENTS

| | | | |
|---|---|---|---|
| 6,480,852 B1 | 11/2002 | Himmel et al. | |
| 8,533,199 B2 | 9/2013 | Malla | |
| 2003/0093316 A1* | 5/2003 | Wirth et al. | 705/14 |
| 2004/0119760 A1 | 6/2004 | Grossman et al. | |
| 2004/0221231 A1* | 11/2004 | Madril et al. | 715/527 |
| 2005/0028207 A1* | 2/2005 | Finseth et al. | 725/46 |
| 2006/0031203 A1 | 2/2006 | Rosenbaum et al. | |
| 2006/0167991 A1 | 7/2006 | Heikes et al. | |
| 2007/0067331 A1 | 3/2007 | Schachter et al. | |
| 2007/0208992 A1 | 9/2007 | Koren | |
| 2007/0210419 A1 | 9/2007 | Nawate et al. | |
| 2007/0244903 A1 | 10/2007 | Ratliff et al. | |
| 2008/0046507 A1* | 2/2008 | Westphal | 709/203 |
| 2008/0052203 A1 | 2/2008 | Beyer et al. | |
| 2008/0098087 A1 | 4/2008 | Lubeck | |
| 2008/0098313 A1 | 4/2008 | Pollack | |
| 2008/0263135 A1 | 10/2008 | Olliphant | |
| 2008/0320419 A1 | 12/2008 | Matas et al. | |
| 2009/0089364 A1 | 4/2009 | Hamilton II et al. | |
| 2009/0099995 A1 | 4/2009 | Tzeng | |
| 2009/0132665 A1* | 5/2009 | Thomsen et al. | 709/206 |
| 2009/0144254 A1 | 6/2009 | O'Sullivan et al. | |

(Continued)

FOREIGN PATENT DOCUMENTS

KR    1020090089004    8/2009

OTHER PUBLICATIONS

International Search Report of PCT Application No. PCT/2009/066257 dated Jul. 1, 2010, pp. 1-3 pages.

(Continued)

*Primary Examiner* — Peiyong Weng
(74) *Attorney, Agent, or Firm* — Perkins Coie LLP

(57) ABSTRACT

In one embodiment, a server receives a request from a first user to share content from a first forum (e.g., a webpage) with a second user. In response, the server generates a link to the content for use by the second user. This link includes a pointer to a first user preference associated with the first user. In some instances, the first user preference is stored in conjunction with a unique identifier associated with the first user. Subsequently, when the second user attempts to access the content, the server generates a second webpage that includes the content. The server customizes the webpage (that is to be displayed to the second user) by using the user preferences associated with the first user.

31 Claims, 6 Drawing Sheets

(56) References Cited

U.S. PATENT DOCUMENTS

| | | | |
|---|---|---|---|
| 2009/0177744 | A1 | 7/2009 | Marlow et al. |
| 2009/0254615 | A1 | 10/2009 | Baliga et al. |
| 2009/0281724 | A1 | 11/2009 | Blumenberg et al. |
| 2009/0320091 | A1 | 12/2009 | Torres et al. |
| 2010/0162091 | A1 | 6/2010 | Yepez |
| 2011/0087966 | A1* | 4/2011 | Leviathan .................... 715/745 |
| 2012/0066026 | A1 | 3/2012 | Dusig et al. |
| 2012/0072263 | A1 | 3/2012 | Dusig et al. |
| 2012/0072288 | A1 | 3/2012 | Dusig et al. |

OTHER PUBLICATIONS

Written Opinion of PCT Application No. PCT/2009/066257 dated Jul. 1, 2010, pp. 1-4.
Softpedia, Super Tell a Friend Script. <http://webscripts.softpedia.com/script/Mailing-List-Managers/Super-Tell-a-Friend-Script-43914.html>; Copyright 2001-2012 Softpedia [Accessed on Sep. 13, 2012].
Tell A Friend Script With Contact Importer, Increase Website Traffic! <http://www.super-tell-a-friend.com/index.php>; Copyright 2008-2011 super-tell-a-friend.com; [Website accessed on Jan. 17, 2012].
International Search Report and Written Opinion for PCT/US2011/028876 dated Sep. 20, 2011, 2 pages.
Non-Final Office Action mailed Oct. 7, 2013 for U.S. Appl. No. 13/430,411 by Hoag, A.J. et al., filed Mar. 26, 2012.
Final Office Action mailed May 14, 2014, for U.S. Appl. No. 13/430,411 by Hoag, A.J. et al., filed Mar. 26, 2012.
Degnan, Christa, "New Online Planner Links Users," PC Week, Jul. 19, 1999 Feb. 16, 2012 <http://web.ebscohost.com/ehost/delivery?sid+0401dbff-87c7-45cb-8b3e-3a677f1cb297%4 . . . >.
Softpedia, Super Tell a Friend Script. <http://webscripts.softpedia.com/script/Mailing-List-Managers/Super-Tell-a-Friend-Script-43914.html>.
Tell a Friend Script With Contact Importer, Increase Website Traffic! <http://www.super-tell-a-friend.com/index.php>.
International Search Report PCT/US201128876 dated Oct. 4, 2012, 2 pages.
Written Opinion PCT/US201128876 dated Oct. 4, 2012, 5 pages.
Co-pending U.S. Appl. No. 61/138,387, filed Dec. 17, 2008.
Co-pending U.S. Appl. No. 61/467,585, filed Mar. 25, 2011.
Co-pending U.S. Appl. No. 61/467,596, filed Mar. 25, 2011.
Co-pending U.S. Appl. No. 13/430,411, filed Mar. 26, 2012.
Co-pending U.S. Appl. No. 12/337,373, filed Dec. 17, 2008.
Non-Final Office Action mailed Mar. 23, 2012 in Co-Pending U.S. Appl. No. 12/337,373, filed Dec. 17, 2008.
Final Office Action mailed Sep. 26, 2012 in Co-Pending U.S. Appl. No. 12/337,373, filed Dec. 17, 2008.
Advisory Action mailed Sep. 8, 2014, for U.S. Appl. No. 13/430,411 by Hoag, A.J. et al., filed Mar. 26, 2012.
Non-Final Office Action mailed Aug. 15, 2014 in Co-Pending U.S. Appl. No. 12/337,373, filed Dec. 17, 2008.
Final Office Action mailed Mar. 2, 2015, in U.S. Appl. No. 12/337,373, filed Dec. 17, 2008.

* cited by examiner

CUSTOMIZING CONTENT DISPLAYED FOR A USER BASED ON USER PREFERENCES OF ANOTHER USER

FIELD

The present invention generally relates to the field of customizing online content displayed to a user based on certain user preferences. More particularly, the present invention relates to customizing content displayed for a user based on user preferences of another user.

BACKGROUND

With the rapid increase and advances in internet technology, the world wide web (hereinafter the "web" or the "internet") has become a ubiquitous source of information. For example, the web is widely used to advertise information about events (e.g., concerts, public gatherings, etc.). The web is also the primary vehicle for e-commerce, allowing people to sell or purchase products or services over electronic systems. In most cases, website providers equate revenue by the number of people that view or use their webpages. In order to increase the number of viewers to their webpages, and in order to increase their revenue resulting from such viewers, website providers often "customize" their webpages to readily suit the preferences of their viewers. In some examples, the website providers capture preferences by tracking the viewers' usage histories, and extracting preference information based on such usage histories. However, if the website provider does not have sufficient information about a user (e.g., when the user has never visited a webpage offered by the website provider, the user has not spent sufficient time browsing webpages offered by the website provider to identify an adequate number of preferences, etc.), the website provider is unable to customize or personalize webpages displayed to such a user.

SUMMARY OF THE DESCRIPTION

At least one embodiment of this invention pertains to a service and a system for displaying customized content on a webpage based on a user's personal preferences. In one embodiment, a server (e.g., a web server or an administration server) receives a request from a first user to share content from a first forum (e.g., a webpage) with a second user. In response, the server generates a link to the content for use by the second user. This link includes a pointer to a first user preference associated with the first user. In some instances, the first user preference is stored in conjunction with a unique identifier associated with the first user. Subsequently, when the second user attempts to access the content, the server generates a second webpage that includes the content. The server customizes the webpage (that is to be displayed to the second user) by using the user preferences associated with the first user.

Accordingly, even if the server does not have sufficient usage history or previously-recorded user preferences for the second user, the server is able to customize a display for the second user based on user preferences of the first user. Because the first user initiated the sharing, and specifically selected particular content to share with the second user, the underlying basis is that the first user is aware of at least some of the second user's preferences. Therefore the first user and the second user have at least some common preferences that can be used advantageously in customizing a website for a user, where customization information is otherwise unavailable.

Other advantages and features will become apparent from the following description and claims. It should be understood that the description and specific examples are intended for purposes of illustration only and not intended to limit the scope of the present disclosure.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

Figure 1:
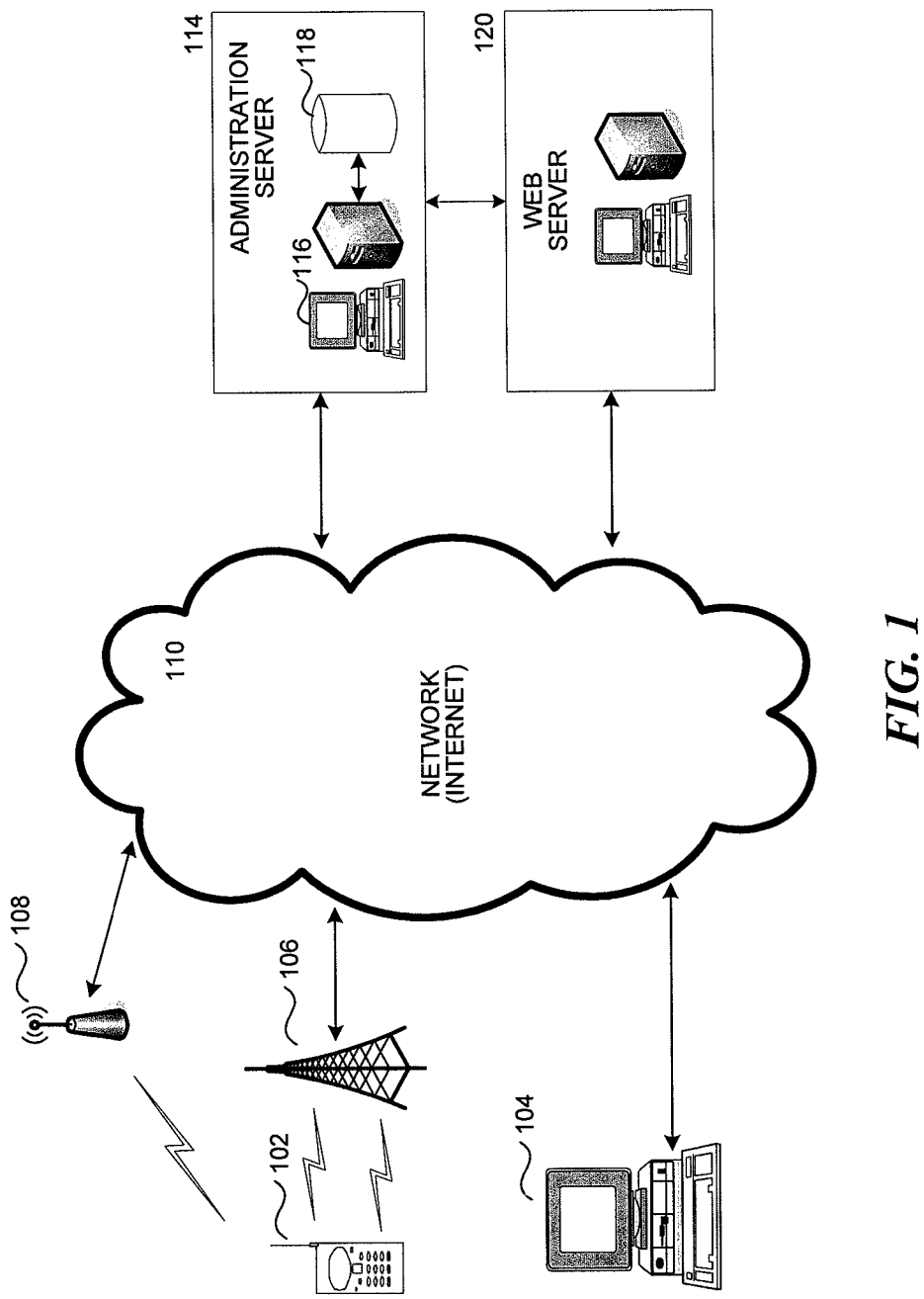
FIG. 1 provides a brief, general description of a representative environment in which the invention can be implemented.

The headings provided herein are for convenience only and do not necessarily affect the scope or meaning of the claimed invention.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 114 is first introduced and discussed with respect to FIG. 1).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

FIG. 1 and the following discussion provide a brief, general description of a representative environment in which the invention can be implemented. Although not required, aspects of the invention may be described below in the general context of computer-executable instructions, such as routines executed by a general-purpose data processing device (e.g., a server computer or a personal computer). Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems.

While aspects of the invention, such as certain functions, are described as being performed exclusively on a single device, the invention can also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the invention may be distributed over the Internet or over other networks (including wireless networks), on a propagated signal on a propagation medium (e.g., an electromagnetic wave (s), a sound wave, etc.) over a period of time. In some implementations, the data may be provided on any analog or digital network (packet switched, circuit switched, or other scheme).

As shown in FIG. 1, a user may use a personal computing device (e.g., a phone 102, a personal computer 104, etc.) to communicate with a network. The term "phone," as used herein, may be a cell phone, a personal digital assistant (PDA), a portable email device (e.g., a Blackberry®), a portable media player (e.g., an IPod Touch®), or any other device having communication capability to connect to the network. In one example, the phone 102 connects using one or more cellular transceivers or base station antennas 106 (in cellular implementations), access points, terminal adapters, routers or modems 108 (in IP-based telecommunications implementations), or combinations of the foregoing (in converged network embodiments).

In some instances, the network 110 is the Internet, allowing the phone 102 (with, for example, WiFi capability) or the personal computer 104 to access web content offered through various web servers. In some instances, especially where the phone 102 is used to access web content through the network 110 (e.g., when a 3G or an LTE service of the phone 102 is used to connect to the network 110), the network 110 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

In some instances, a user uses one of the personal computing devices (e.g., the phone 102, the personal computer 104, etc.) to connect to an administration server 114 through the network 110. In one embodiment, the administration server 114 comprises a server computer 116 coupled to a local database 118. The term "administration server" as indicated herein, refers to an individual or multiple server stations or other computing apparatus. In one embodiment, the administration server is a web server capable of hosting a website and storing content (e.g., various webpages) that is associated with the website. In some embodiments, the administration server is separate from a web server, but communicates with a web server to provide, manage, and/or control content generated by the web server. In general, the administration server 114 controls content provided through webpages (by, e.g., a website provider or a web server), to, for example, customize the content of the webpages based on previously identified preferences of users.

As will be explained in further detail herein, the administration server 114 incorporates one or more functional units to achieve each of the above discussed functionalities.

As shown in FIG. 1, in some embodiments, the personal computing devices and the administration server 114 are connected through the network 110 to one or more web servers (e.g., web server 120). Each web server corresponds to a computing station that enables a website provider, for example, to provide web content (e.g., web pages) that can be accessed by the personal computing devices through the network 110.

An administration server, as defined herein, could be a separate server offering the service described herein to, for example, one or more website providers. In other examples, the administration server could by itself be a website provider that also runs a service that accomplishes the techniques described herein. Additional examples of implementing an administration server, as understood by a person of ordinary skill in the art, are equally suitable for implementing the techniques described herein.

As will be explained in further detail below, the administration server 114 operates in conjunction with a website provider to monitor activities of users and to capture user preferences associated with such users. Examples of user preferences include certain activities of the user (e.g., signing up for email alerts relating to shopping deals, clicking on advertisements relating to travel deals, etc.), types of services requested or accessed by the user (e.g., requests for movie reviews, review articles on certain types of sports, fashion tips relating to a certain type of clothing, etc.). The administration server 114 stores such preferences in association with a unique identifier associated with the user. For example, the administration server 114 uses a cookie (e.g., stored in the user's computing device) or a portion of the user's data request (e.g., information in the headers of the user's request) to establish a unique identifier for the user. Once the unique identifier is established, the administration server 114 tracks subsequent actions of the user and generates user preferences based on such actions. The administration server 114 also stores such preferences in association with the user's unique identifier.

In some embodiments, the administration server 114 stores the unique identifier and the user preference information in a database connected to the administration server 114. In some embodiments, the administration server 114 stores the unique identifier directly on the user's client computing device, and accesses such information through the network 110. Other means or methods for creating a unique identifier and/or storing user preferences in conjunction with the unique identifier, as will be appreciated by a person of ordinary skill in the art, are equally effective for implementation in addition to the examples discussed herein.

In one embodiment, when a user A wishes to share a piece of content or target link (e.g., a link to a shopping sale alert included in a webpage) from a webpage with a user B, the administration server 114, for example, coordinates with the web server 120 to generate a link address (e.g., a URL link) to the target link. In some embodiments, the link address includes a pointer to the unique identifier (and accordingly to the user preferences stored in association with the unique identifier). Accordingly, the link address is linked to the user preferences associated with the user.

In some embodiments, the administration server 114 is further responsible for customizing the content of the webpage that is displayed in response to user B accessing the link address. When the administration server 114 identifies the request from user B, the administration server 114 customizes the webpage (displayed in response to the link address) so as to reflect the user preferences of user A. The underlying basis is that user A typically shares information with people having similar taste. For example, if user A shares (with user B) a specific event happening at a local jazz club, the assumption is that user A knows of user B's preferences (and at least shares a part of user A's preferences). Because user B (upon entering the webpage through the shared link address) is previously unknown to the web server (the web server is only aware of user A's preferences), prior art web servers or administration servers would display a standard web page without any customization (based on user preferences). However, administration server 114 takes advantage of the knowledge that user A shares at least some preferences with user B—therefore administration server 114 customizes the webpage displayed to user B (upon user B accessing the link address) according to the user preferences of user A.

Consider the following example: User A shares a link related to an event at a local jazz club. The administration server, based on user A's previous activities, records user A's preferences to include local events related to light music and classical music. Accordingly, when user B's webpage is displayed, the administration server 114 causes the webpage to be customized to include information (e.g., customized advertisements, customized local event listings, customized news articles, etc.) related to light music and classical music events.

It is important to note that for purpose of further illustration, it is useful to consider the techniques explained herein as it applies to display and customization of websites or webpages. Of course, however, it should be noted that the techniques introduced here extend to other scenarios where user preferences of one user is applied to customize display of information for another user. An example of such a scenario is a forum that allows users to stream online music or videos for a subscription fee. Such websites provide "suggestions" of related movies or music based on the user's prior viewing or listening history. When a user of such a service shares a particular music or movie link with a second user, the techniques discussed herein can be utilized to create a list of "suggestions" for the second user based simply on the first user's listed suggestions (without ever having recorded a usage history for the second user). A "forum," as indicated herein, refers to any application that allows a user to view and access digital information displayed over a network. Illustrative examples include webpages, digital music players (e.g., iTunes®), etc.

Figure 2:
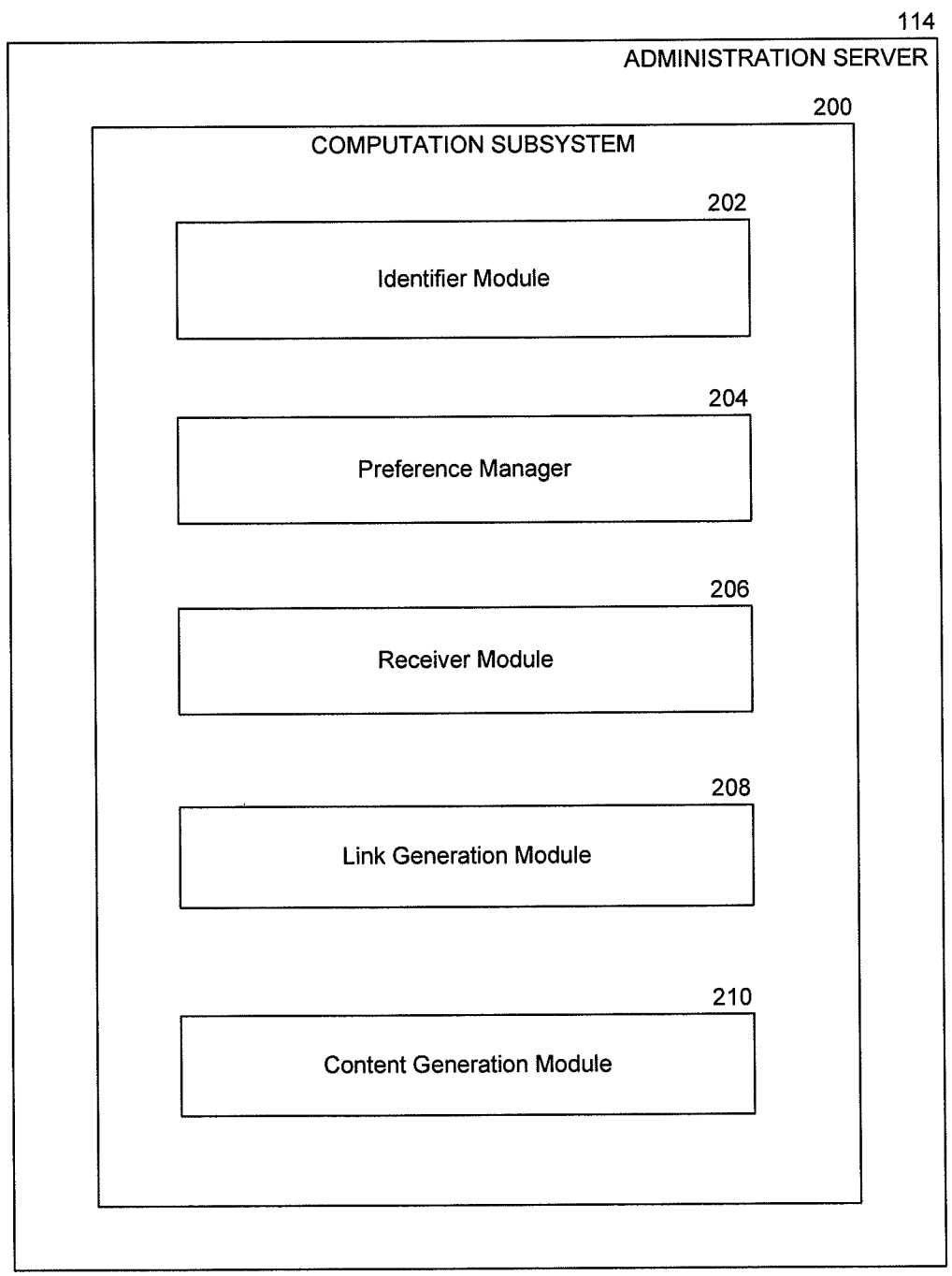
FIG. 2 is a block diagram illustrating an exemplary architecture of an administration server.

FIG. 2 is a block diagram illustrating an exemplary architecture of an administration server 114 configured to perform the various functionalities described herein. In the illustrated embodiment, the administration server 114 includes a computation subsystem 200, which performs functionalities of the administration server 114. The computation subsystem 200 can be implemented by using programmable circuitry programmed by software and/or firmware, or by using special-purpose hardwired circuitry, or by using a combination of such embodiments. In some instances, the computation subsystem 200Receiv is implemented as a unit in a processor of the deals server.

In one embodiment, the administration server 114 includes an identifier module 202 that is configured to generate a unique identifier for the users (e.g., user A, user B, etc.) of the webpage provided by the website provider. As explained above, the identifier module 202 causes the unique identifiers to be stored locally with the administration server 114 or in the respective clients' computing devices. In some embodiments, the administration server 114 includes a preference manager 204 that communicates with the identifier module 202 to identify and store user preferences associated with the users. The preference manager 204 causes the users' preferences to be stored in association with the users' respective unique identifiers. In some instances, the user preferences are stored in the form of records in a database, with each record pointing to the user preferences of a particular user.

In some instances, the administration server 114 includes a receiver module 206 to receive requests from a given user (e.g., user A) to generate a link address in response to sharing (with, e.g., user B) particular information from a website. The receiver module 206 communicates with a link generation module 20 to cause the link address to be generated. The link generation module 208 generates the link address such that the link address includes a pointer to user A's unique identifier. In some instances, the receiver module 208 delivers the link address to user A to allow user A to transmit the link address to user B. In some instances, the administration server 114 directly transmits the link address to user A. In other instances, user A receives the link address and then transmits the information to user B (e.g., over email, over telephone, by written note, etc.).

In some embodiments, the administration server 114 includes a content generation module 210 that causes the content of the webpage (corresponding to the link address) to be generated and displayed to user B. As described above, the content generation module 210 customizes the content to be displayed to user B based on the user preferences of user A.

In some embodiments, the identifier module 202 is further configured to detect a use by user B and create a unique identifier for user B. The preference manager 204 is correspondingly configured to capture and record the user preferences of user B. In some embodiments, the preference manager 204 creates a common preference network that includes links to the unique identifiers of user A and user B. In one embodiment, the preference network could be an independent entity that contains the combined user preferences of users A and B. In other embodiments, the preference network operates contains, for example, pointers or links to the individual user preferences. Accordingly, the common preference network effectively includes user preferences corresponding to both user A and user B. Subsequently, when either user A or user B wishes to share new content with a third user (user C), the content generation module 210 utilizes a combination of the user preferences of users A and B (e.g., as indicated by the common preference network) for customizing content displayed to user C.

In some embodiments, when either user A or user B returns to access a webpage offered by the website provider, the content generation module 210 updates the customization of the corresponding webpage based on a combination of the user preferences of users A and B.

In some embodiments, the preference manager 204 identifies specific high-level categories of preferences (e.g., movies, local music events, sport news, etc.) based on the recorded user preferences of each user. In such instances, the content generation module 210, when combining preferences of users A and B (as illustrated above), combines only those preferences that fall under the high-level categories that are common to both user A and user B. Consider the following scenario: based on user A's activities, the preference manager 204 records a number of preferences under the following high-level categories for user A: movie reviews, local concerts, local fundraising events. Similarly, the preference manager 204 records a number of preferences under the following high-level categories for user B: movie reviews, shopping deals, local sports news. In such a scenario, when the preference manager 204 combines the user preferences of user A and user B, it combines only those preferences that fall under categories that are common to user A and user B. In the above example, only the respective user preferences of user A and user B falling under the category "movie reviews" are used in combination for customizing content displayed to a third user (user C) or for customizing subsequent content for users A and B.

Figure 3:
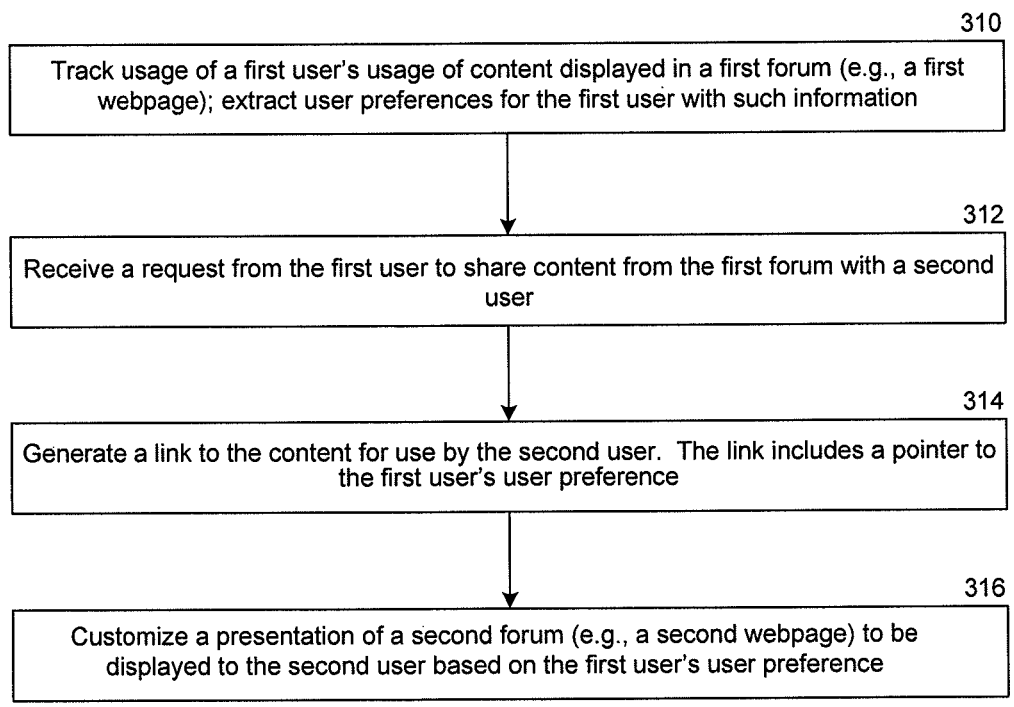
FIG. 3 is a flow diagram depicting an example of an overall method for displaying personalized content.

FIG. 3 is a flow diagram depicting an example of an overall method for displaying personalized content. At block 310, a server (e.g., an administration server) tracks usage of a user (e.g., user A) of content provided in a first forum (e.g., content displayed in a webpage). In some instances, as discussed above, the server records the user preferences in conjunction with a unique identifier associated with the user. At block 312, the server receives a request from user A to share content (e.g., a link to an invitation to a local concert) with a second user (e.g., user B). Upon receiving the request, the server, at block 314, generates a link to the content for use by the second user. This link includes a pointer to the user preference of user A. In some instances, the link includes a pointer to the unique identifier associated with user A, which effectively provides a pointer to the user preference stored in association with user A. At block 316, the server customizes a presentation of a second forum (e.g., a second webpage) to be displayed to user B based on the user preference of user A. Accordingly, instead of presenting a webpage with no customization to user B (because the server does not have information yet about user B), the server customizes the presentation based on the user preference of user A. In some instances, the first forum and the second forum are customized variations (i.e., based on user preferences) of content presented by a particular forum provider (e.g., a website provider).

Figure 4:
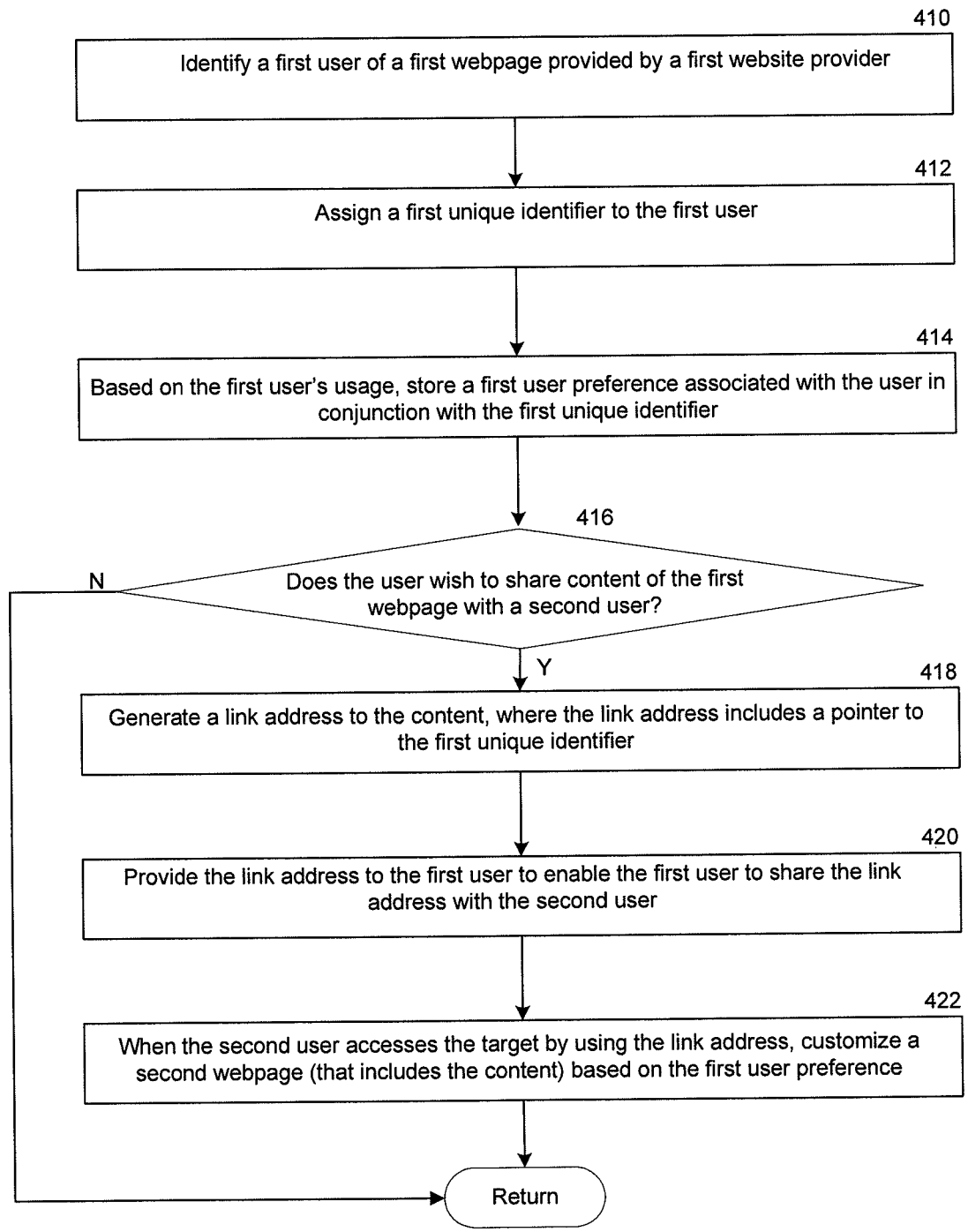
FIG. 4 is a flow diagram depicting another example of a method for customizing content displayed in a webpage.

FIG. 4 is a flow diagram depicting another example of a method for customizing content displayed in a webpage. At block 410, a server (e.g., an administration server) identifies a first user of a first webpage provided by a website provider. At block 412, the server assigns a first unique identifier to the first user. In some instances, as discussed above, the first unique identifier is stored either at the site of the server or at the site of the user's personal computing device. Subsequently, at block 414, based on the first user's usage history, the server stores a first user preference associated with the first user. In some instances, the first user preference is stored in conjunction with the first unique identifier.

At step 416, the server receives a request from the first user to share a content or target of the first webpage with a second user. When the server receives such a request, the process proceeds to block 418, where the server generates a link address to the content or target. In some instances, as discussed above, the link address includes a pointer to the first unique identifier (and accordingly to the first user preference). At block 420, the server provides the link address to the first user, to enable the first user to share the link address with the second user. Alternately, the server may directly transmit the link address to the second user.

At block 422, the server identifies an attempt by the second user to access the content (by, e.g., typing the link address in a URL section of a web browser), the server generates a second webpage to be displayed in response. The server customizes the second webpage based on the first user preference. In some instances, the first webpage and the second webpage are operated by a common website provider, and the first webpage and the second webpage are customized variations (e.g., customized to the first user and the second user) of content provided by the common website provider.

Figure 5:
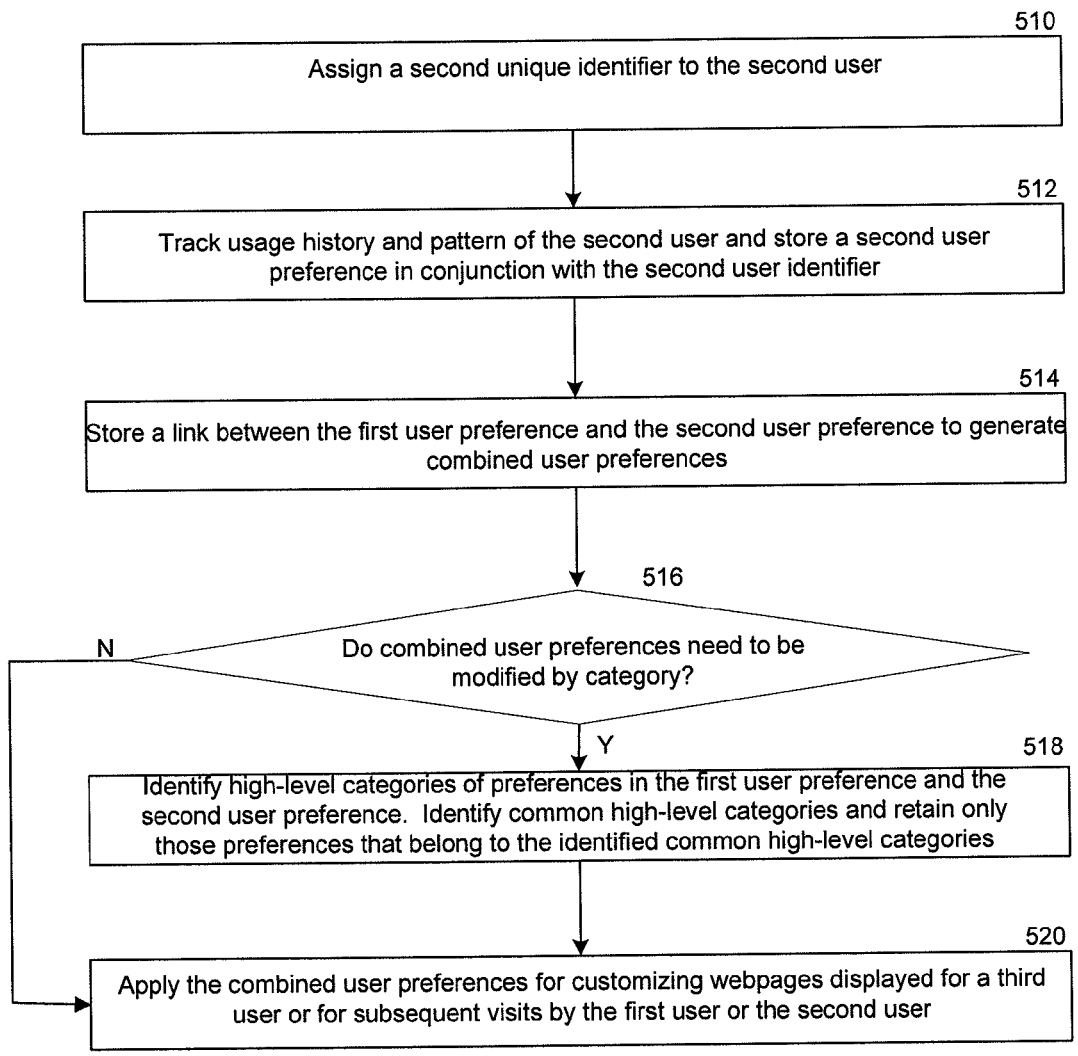
FIG. 5 is another flow diagram depicting an enhanced process for customizing content of webpages based on different user preferences.

FIG. 5 is another flow diagram depicting an enhanced process for customizing content of webpages based on different user preferences. At block 510, the server assigns a second unique identifier to the second user. At block 512, the server tracks the usage pattern and history of the second user and stores a second user preference in conjunction with the second unique identifier. At block 514, the server, for example, stores a link between the first user and the second user preference using a common preference network. The preference network effectively includes combined user preferences of the first and the second user.

At block 516, the process optionally determines whether the combined preferences need to be modified based on common preference categories. If the combined preferences need to be modified, the process moves to block 518, where the server identifies high-level categories of preferences in user preferences for the first and second users. The server further identifies common high-level categories (i.e., common to both the first user and the second user) and combines (i.e., in the common preference network) only those user preferences that fall under high-level categories that are common to both the first and the second users. Subsequently (or if the combined preferences do not need to be modified at block 516), the process shifts to block 520, where the combined preferences are applied for subsequent webpage customizations. Such customizations occur, for example, during display of a third webpage to a third user, when either the first user or the second user shares a target with the third user. The combined preferences may also be used for customizing subsequent webpages displayed for either the first user or the second user.

Figure 6:
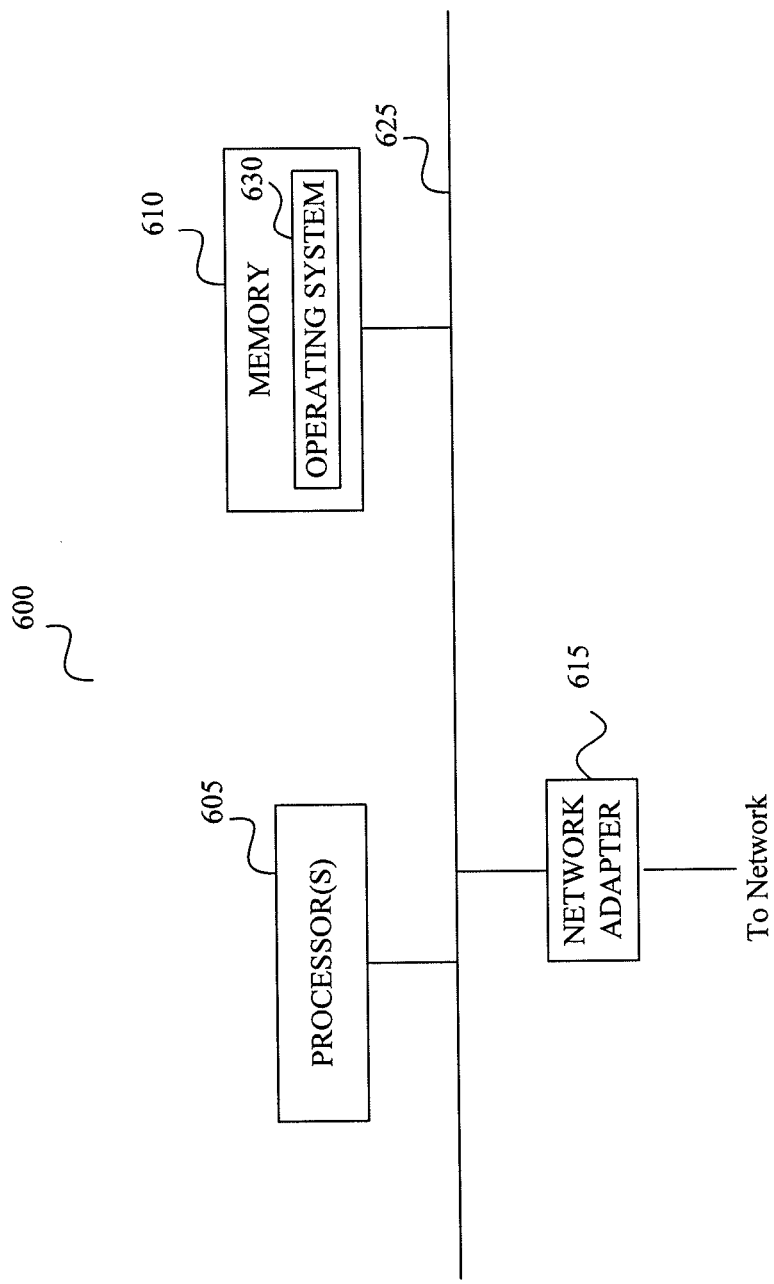
FIG. 6 is a high-level block diagram showing an example of the architecture for a computer system.

FIG. 6 is a high-level block diagram showing an example of the architecture for a computer system 600 that can be utilized to implement an administration server (e.g., 114 from FIG. 1), a web server (e.g., 125 from FIG. 1), etc. In FIG. 6, the computer system 600 includes one or more processors 605 and memory 610 connected via an interconnect 625. The interconnect 625 is an abstraction that represents any one or more separate physical buses, point to point connections, or both connected by appropriate bridges, adapters, or controllers. The interconnect 625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

The processor(s) 605 may include central processing units (CPUs) to control the overall operation of, for example, the host computer. In certain embodiments, the processor(s) 605 accomplish this by executing software or firmware stored in memory 610. The processor(s) 605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 610 is or includes the main memory of the computer system 1100. The memory 610 represents any form of random access memory (RAM), read-only memory (ROM), flash memory (as discussed above), or the like, or a combination of such devices. In use, the memory 610 may contain, among other things, a set of machine instructions which, when executed by processor 605, causes the processor 605 to perform operations to implement embodiments of the present invention.

Also connected to the processor(s) 605 through the interconnect 625 is a network adapter 615. The network adapter 615 provides the computer system 600 with the ability to communicate with remote devices, such as the storage clients, and/or other storage servers, and may be, for example, an Ethernet adapter or Fiber Channel adapter.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, 116 will begin with the words "means for.") Accordingly, the applicant reserves the right to add additional claims after filing the application to pursue such additional claim forms for other aspects of the invention.

We claim:

1. A method for displaying personalized information, the method comprising:
    generating a first plurality of preferences for a first user based on a monitoring of usage histories of the first user in a first forum;
    providing an option for the first user to select, from the first forum, a content associated with a subset of the first plurality of preferences;
    receiving a request from the first user to share, with a second user, the selected content associated with the subset of the first plurality of preferences;
    in response to the request from the first user to share the selected content associated with the subset of the first plurality of preferences, generating, for use by the second user, a link to the selected content, wherein said generating comprises including, in the link to the selected content, a pointer to the first plurality of preferences; and
    upon receiving an access request from the second user to access the link to the selected content associated with the subset of the first plurality of preferences, generating, based on the pointer to the first plurality of preferences included in the link, a customized presentation of a second forum for display to the second user, said generating comprising generating customized content based on the first plurality of preferences associated with the pointer included in the link, wherein the customized presentation is generated to include the customized content and the selected content shared by the first user.

2. The method of claim 1, further comprising:
establishing a first unique identifier for the first user; and
storing the first plurality of preferences in conjunction with the first unique identifier.

3. The method of claim 1, wherein the first forum is a first webpage, and the second forum is a second webpage.

4. The method of claim 3, wherein the first webpage and the second webpage are customized variations of web content displayed by a given website provider.

5. The method of claim 1, wherein the link to the selected content is a URL to the second forum.

6. The method of claim 1, further comprising:
generating a second plurality of preferences for the second user based on the monitoring of usage histories of the second user in the second forum; and
providing a second option for the second user to select a second content associated with a subset of the second plurality of preferences, wherein the second plurality of preferences is stored in conjunction with a second unique identifier associated with the second user.

7. The method of claim 6, further comprising:
receiving a second request from either the first user or the second user to share, with a third user, the second content associated with the subset of the second plurality of preferences;
generating, for use by the third user, a second link to the second content associated with the subset of the second plurality of preferences, wherein said generating comprises including, in the second link to the second content, the pointer to the first plurality of preferences of the first user and a pointer to the second plurality of preferences of the second user;
upon receiving a second access request from the third user to access the second link to the second content associated with the subset of the second plurality of preferences, generating, based on the pointers to the first and second plurality of preferences included in the second link, a second customized presentation of a third forum for display to the third user, said generating comprising generating second customized content based on the first and second plurality of preferences associated with the pointers included in the second link, wherein the second customized presentation is generated to include the second customized content and the second content shared by either the first user or the second user.

8. The method of claim 7, further comprising:
generating a third plurality of preferences for the third user based on the monitoring of usage histories of the third user in the third forum;
providing a third option for the third user to select a third content associated with a subset of the third plurality of preferences;
maintaining a preference network comprising links to the first plurality of preferences, the second plurality of preferences, and the third plurality of preferences, wherein the preference network includes a combination of the first plurality of preferences, the second plurality of preferences, and the third plurality of preferences.

9. One or more non-transitory computer-readable media storing computer-executable instructions for implementing a method for customizing content displayed in a webpage, comprising:

instructions for generating a first plurality of preferences for a first user based on a monitoring of usage histories of the first user in a first webpage provided by a first website provider;
instructions for providing an option for the first user to select, from the first webpage, a first content associated with a subset of the first plurality of preferences;
instructions for receiving a request from the first user to share, with a second user, a target link to the first content of the first webpage;
instructions for generating a link address to the target link, wherein said generating comprises storing a first unique identifier associated with the first user in conjunction with the first plurality of preferences and including, in the link address, a pointer to the first unique identifier;
instructions for providing the link address to the first user to enable the first user to share the link address with the second user;
instructions for identifying an access request by the second user to access the target link through the link address; and
instructions for generating a presentation of a second webpage for display to the second user, said generating comprising generating customized content based on the first plurality of preferences stored in conjunction with the first unique identifier included in the link address, wherein the presentation of the second webpage is generated to include the customized content and the first content associated with the subset of the first plurality of preferences.

10. The one or more non-transitory computer-readable media of claim 9, further comprising:
instructions for generating a second plurality of preferences for the second user based on the monitoring of usage histories of the second user in the second webpage; and
instructions for providing a second option for the second user to select, from the second webpage, a second content associated with a subset of the second plurality of preferences, wherein the second plurality of preferences is stored in conjunction with a second unique identifier associated with the second user.

11. The one or more non-transitory computer-readable media of claim 10, wherein, subsequent to the instructions for providing the second option for the second user to select the second content associated with the subset of the second plurality of preferences, further comprising:
instructions for identifying a second access request from the first user to access a given webpage provided by the first website provider; and
instructions for generating second customized content for the given webpage for display to the first user based on the second plurality of preferences of the second user.

12. The one or more non-transitory computer-readable media of claim 10, wherein, subsequent to the instructions for providing the second option for the second user to select the second content associated with the subset of the second plurality of preferences, further comprising:
instructions for identifying a second access request from the first user to access a given webpage provided by the first website provider; and
instructions for generating second customized content for the given webpage based on a combination of the first plurality of preferences and the second plurality of preferences.

13. The one or more non-transitory computer-readable media of claim 10, further comprising:

instructions for storing a link between the first plurality of preferences and the second plurality of preferences;

instructions for maintaining a common set of user preferences shared between the first plurality of preferences and the second plurality of preferences; and instructions for utilizing the common set of user preferences for generating customized webpages requested by the first user and/or the second user.

14. A method for customizing content displayed in a webpage, the method comprising:

identifying, by an administration server, a first user of a first webpage provided by a first website provider;

assigning, by the administration server, a first unique identifier to the first user;

generating, by the administration server, a first plurality of preferences for the first user based on a monitoring of usage histories of the first user in the first webpage;

storing, by the administration server, an association between the first plurality of preferences and the first unique identifier;

receiving, by the administration server, a request from the first user to share, with a second user, a given target of the first webpage, the given target including given content associated with a subset of the first plurality of preferences of the first user;

generating, by the administration server, a link address to the given target, wherein said generating comprises including, in the link address to the given target, a pointer to the first unique identifier, the first unique identifier pointing to the first plurality of preferences of the first user based on the stored association;

identifying, by the administration server, an access request by the second user to access the given target through the link address; and generating, by the administration server, customized content of a second webpage for display to the second user based on the first plurality of preferences associated with the first unique identifier that is included in the link address to the given target, wherein the customized content is generated to include new content associated with the first plurality of preferences and the given content included in the given target shared by the first user.

15. The method of claim 14, further comprising:

generating, by the administration server, a second plurality of preferences for the second user based on the monitoring of usage histories of the second user in the second webpage;

identifying, by the administration server, a second access request by the first user to access a given webpage provided by the first website provider; and generating, by the administration server, a given customized content of the given webpage for display to the first user based on the second plurality of preferences of the second user.

16. The method of claim 15, further comprising:

identifying a third access request by the first user to access a second given webpage provided by the first website provider; and generating a second given customized content of the second given webpage based on a combination of the first plurality of preferences and the second plurality of preferences.

17. A method for displaying personalized content, the method comprising:

generating a first plurality of preferences for a first user based on a monitoring of usage histories of the first user in a first forum;

providing an option for the first user to select a content associated with a subset of the first plurality of preferences;

receiving a request from the first user to share, with a second user, the content from the first forum, the content associated with the subset of the first plurality of preferences;

generating a link to the content for use by the second user, wherein said generating comprises including, in the link to the content, a pointer to a combined user preference network, the combined user preference network including the first plurality of preferences and a selected plurality of preferences associated with selected one or more other users; and upon receiving an access request from the second user to access the link, generating, based on the pointer to the combined user preference network included in the link, a customized presentation of a second forum for display to the second user, said generating comprising generating customized content based on the combined user preference network, wherein the customized presentation is generated to include the customized content and the content shared by the first user.

18. The method of claim 17, further comprising:

establishing unique identifiers for the first user and the selected one or more other users; and storing the first plurality of preferences and the selected plurality of preferences in conjunction with the unique identifiers.

19. The method of claim 17, wherein the first forum is a first webpage, and the second forum is a second webpage.

20. The method of claim 19, wherein the first webpage and the second webpage are customized variations of web content displayed by a given website provider.

21. The method of claim 17, wherein the link to the content is a URL to the second forum.

22. The method of claim 17, further comprising:

generating a second plurality of preferences for the second user based on the monitoring of usage histories of the second user in the second forum; and providing a second option for the second user to select a second content associated with a subset of the second plurality of preferences, wherein the second plurality of preferences is stored in conjunction with a second unique identifier associated with the second user resulting in an updated combined user preference network.

23. The method of claim 22, further comprising:

receiving a second access request from the first user or the second user to share a given content with a third user;

generating a second link to the given content for use by the third user, wherein said generating comprises including, in the second link to the given content, a pointer to the updated combined user preference network, the updated combined user preference network including pointers to the first plurality of preferences, the selected plurality of preferences, and the second plurality of preferences; and upon receiving a second access request from the third user to access the second link, generating, based on the updated combined user preference network included in the second link, a second customized presentation of a third forum for display to the third user.

24. The method of claim 23, further comprising:

generating a third plurality of preferences for a third user based on the monitoring of usage histories of the third user in the third forum; and providing a third option for the third user to select a third content associated with a subset of the third plurality of preferences, the third plurality of preferences stored in conjunction with a third unique identifier associated with the third user;

maintaining the combined preference network, wherein the combined preference network includes a combination of the second plurality of preferences, the selected plurality of preferences, the second plurality of preferences, and the third plurality of preferences.

25. A system for customizing content displayed in a webpage, the system comprising:

a hardware memory storage device;

a preference manager configured to generate a first plurality of preferences for a first user based on a monitoring of usage histories of the first user in a first webpage provided by a first website provider;

a first receiver module configured to receive a request from a first user to share, with a second user, a target link of the first webpage provided by the first website provider, wherein the target link includes target content associated with a subset of the first plurality of preferences;

a link address generation module, in communication with the preference manager, configured to:
store the first plurality of preferences in association with a first unique identifier associated with the first user;
generate a link address to the target link, wherein to generate comprises to include, in the link address, a pointer to the first unique identifier associated with the first user, the first unique identifier pointing to the first plurality of preferences of the first user based on the stored association;
provide the link address to the first user to enable the first user to share the link address with the second user;

a second receiver module configured to identify an access request by the second user to access the target link through the link address; and a content generation module configured to generate a content of a second webpage for display to the second user based on the first plurality of preferences associated with the first unique identifier that is included in the link address, wherein the content of the second webpage is generated to include new content associated with the first plurality of preferences and the target content included in the target link shared by the first user.

26. The system of claim 25, further comprising an identifier module to generate the first unique identifier of the first user.

27. The system of claim 25, wherein the preference manager is further configured to:
generate a second plurality of preferences for the second user based on the monitoring of usage histories of the second user in the second webpage.

28. The system of claim 27, wherein:
the identification module is further configured to identify an access request by the first user to access a given webpage provided by the first website provider; and
the content generation module is further configured to generate, for display to the first user, a given content of the given webpage based on the second plurality of preferences associated with the second user.

29. The system of system 27, wherein:
the identification module is further configured to identify an access request by the first user to access a given webpage provided by the first website provider; and
the content generation module is further configured to generate, for display to the first user, a given content of the given webpage based on a combination of the first plurality of preferences and the second plurality of preferences.

30. The system of claim 27, wherein the preference manager is further configured to:
store a link between the first plurality of preferences and the second plurality of preferences;
maintain a common set of user preferences shared between the first plurality of preferences and the second plurality of preferences; and
generate customized content of webpages by utilizing the common set of user preferences upon a given request by any of the first user or the second user.

31. The method of claim 1, wherein the customized content associated with the first plurality of preferences comprises any of: a customized advertisement, a customized local event listing, a customized news article, movie suggestion, or music suggestion.

* * * * *